US012756942B2

(12) United States Patent
Yahata

(10) Patent No.: US 12,756,942 B2
(45) Date of Patent: Oct. 6, 2026

(54) IMAGE PROCESSING DEVICE AND IMAGING DEVICE INCLUDING THE SAME

(71) Applicant: SK hynix Inc., Icheon-si (KR)

(72) Inventor: Kazuhiro Yahata, Tokyo (JP)

(73) Assignee: SK HYNIX INC., Icheon-si (KR)

( * ) Notice: Subject to any disclaimer, the term of this patent is extended or adjusted under 35 U.S.C. 154(b) by 77 days.

(21) Appl. No.: 19/054,080

(22) Filed: Feb. 14, 2025

(65) Prior Publication Data

US 2026/0052317 A1 Feb. 19, 2026

(30) Foreign Application Priority Data

Aug. 19, 2024 (KR) ........................ 10-2024-0110633

(51) Int. Cl.
*H04N 23/84* (2023.01)
*H04N 23/67* (2023.01)

(52) U.S. Cl.
CPC ............. *H04N 23/84* (2023.01); *H04N 23/67* (2023.01)

(58) Field of Classification Search
CPC ............................... H04N 23/84; H04N 23/67
USPC ....................................................... 348/222.1
See application file for complete search history.

(56) References Cited

U.S. PATENT DOCUMENTS 6,856,704 B1 * 2/2005 Gallagher ................. G06T 5/20
345/597
8,098,953 B2 * 1/2012 Watanabe ................. G06T 5/20
345/20
8,659,675 B2 * 2/2014 Takahashi ............ H04N 23/843
348/229.1
9,639,771 B2 * 5/2017 Mine .......................... G06T 5/70
10,262,399 B2 * 4/2019 Shi ........................ G06T 3/4015
11,526,966 B2 * 12/2022 Furuki ....................... G06T 5/70
12,482,147 B2 * 11/2025 Yahata ..................... G06T 11/10
2012/0274798 A1 * 11/2012 Takahashi ............ H04N 25/134
348/222.1
2014/0307079 A1 * 10/2014 Aragaki ............... G02B 21/367
348/79
2015/0131889 A1 * 5/2015 Aragaki ............... G06V 20/695
382/133
2016/0171338 A1 * 6/2016 Mine .......................... G06T 5/70
382/199
2017/0318240 A1 * 11/2017 Yu ............................ G06F 18/22
2018/0197277 A1 * 7/2018 Shi ........................ G06T 3/4015
(Continued)

FOREIGN PATENT DOCUMENTS

KR 20120039499 A 4/2012
KR 102332327 B1 11/2021

*Primary Examiner* — Pritham D Prabhakher

(74) *Attorney, Agent, or Firm* — Ashurst Perkins Coie US LLP

(57) ABSTRACT

An image processing device and an imaging device including the same are disclosed, which relate to technology relating to the image processing device for generating a parallax image required for autofocus. The image processing device includes: an image combiner configured to generate a plurality of color images by combining pixel data of unit pixels arranged at the same position in each of a plurality of pixel groups; and a luminance image processor configured to calculate weights based on texture amplitudes of the plurality of color images and texture correlation values between the plurality of color images, and to generate a luminance image by applying the weights to the plurality of color images.

20 Claims, 11 Drawing Sheets

(56) References Cited

U.S. PATENT DOCUMENTS

| | | | | |
|---|---|---|---|---|
| 2021/0012467 | A1* | 1/2021 | Furuki | G06T 5/70 |
| 2024/0273781 | A1* | 8/2024 | Yahata | G06T 11/10 |

* cited by examiner

STANDARD DEVIATION OF NOISE 40
DIFFERENCE IN PIXELS OF THE EDGE REGION 10

STANDARD DEVIATION OF NOISE 10
DIFFERENCE IN PIXELS OF THE EDGE REGION 10

STANDARD DEVIATION OF NOISE 1
DIFFERENCE IN PIXELS OF THE EDGE REGION 10

IMAGE PROCESSING DEVICE AND IMAGING DEVICE INCLUDING THE SAME

CROSS-REFERENCE TO RELATED APPLICATION

This patent document claims the priority and benefits of Korean patent application No. 10-2024-0110633, filed on Aug. 19, 2024, the disclosure of which is incorporated by reference in its entirety as part of the disclosure of this patent document.

TECHNICAL FIELD

The technology and implementations disclosed in this patent document generally relate to an image processing device and an imaging device including the same, and more particularly to technology relating to an image processing device for generating a parallax image required for autofocus.

BACKGROUND

An image sensing device is a device for capturing optical images by converting light into electrical signals using a photosensitive semiconductor material which reacts to light. With the development of automotive, medical, computer and communication industries, the demand for high-performance image sensing devices is increasing in various fields such as smartphones, digital cameras, game machines, IoT (Internet of Things), robots, security cameras and medical micro cameras.

In a device (e.g., a camera) for photographing a target object, it may be important to accurately focus on the target object in order to capture a clear image (e.g., a still image) or video (e.g., moving images).

SUMMARY

Various embodiments of the disclosed technology relate to an image processing device capable of accurately adjusting a focus position by analyzing textures and adding appropriate weights when synthesizing pixel values of respective color pixels to generate a parallax image for autofocus, and an imaging device including the same.

In accordance with an embodiment of the disclosed technology, an image processing device may include: an image combiner configured to generate a plurality of color images by combining pixel data of unit pixels arranged at the same position in each of a plurality of pixel groups of a pixel array; and a luminance image processor configured to calculate weights based on texture amplitudes of the plurality of color images and texture correlation values between the plurality of color images, and to generate a luminance image by applying the weights to the plurality of color images.

In accordance with another embodiment of the disclosed technology, an imaging device may include: a first texture amplitude calculator configured to calculate a texture amplitude of a first color image; a first noise amount calculator configured to calculate a noise amount of the first color image; a calculator configured to generate an average image by averaging a second color image and a third color image having the same color as the second color image; a first texture correlation determiner configured to determine a texture correlation value between the first color image and the average image; a second texture amplitude calculator configured to calculate a texture amplitude of the average image; a second noise amount calculator configured to calculate a noise amount of the average image; a first weight calculator configured to calculate a weight based on output signals of the first and second texture amplitude calculators, output signals of the first and second noise amount calculators, and an output signal of the first texture correlation determiner; and a synthesizer configured to generate a luminance image for autofocus by applying the weight to the first color image and the average image.

It is to be understood that both the foregoing general description and the following detailed description of the disclosed technology are illustrative and explanatory and are intended to provide further explanation of the disclosure as claimed.

BRIEF DESCRIPTION OF THE DRAWINGS

The above and other features and beneficial aspects of the disclosed technology will become readily apparent with reference to the following detailed description when considered in conjunction with the accompanying drawings.

FIG. 6A shows an example diagram that an edge or gradation changes from a black color (BK) to a yellow color (Y) and FIG. 6B shows an example diagram that an edge or gradation changes from a red color (R) to a green color (G).

FIG. 7A shows that an image includes a red region and a green region, FIG. 7B shows a diagram illustrating an example when a pixel value of a red image is added to a green image, and FIG. 7C shows a diagram illustrating an example when a pixel value of a red image is subtracted from a green image.

FIG. 8A shows that an image includes a yellow region and a black region, FIG. 8B shows a diagram illustrating an example when a pixel value of a red image is added to a green image, and FIG. 8C shows a diagram illustrating an example when a pixel value of a red image is subtracted from a green image.

FIG. 9A shows that an image includes a green region and a black region, FIG. 9B shows a diagram illustrating an example when a pixel value of a red image is added to a green image, and FIG. 9C shows a diagram illustrating an example when a pixel value of a red image is subtracted from a green image FIG. 10A shows an example case that the standard deviation of a noise is 40 and a luminance difference in an edge region is 10, FIG. 10B shows an example case that the standard deviation of the noise is 10 and the luminance difference in the edge region is 10, and FIG. 10C shows an example case that the standard deviation of the noise is 1 and the luminance difference in the edge region is 10.

DETAILED DESCRIPTION

Figure 1:
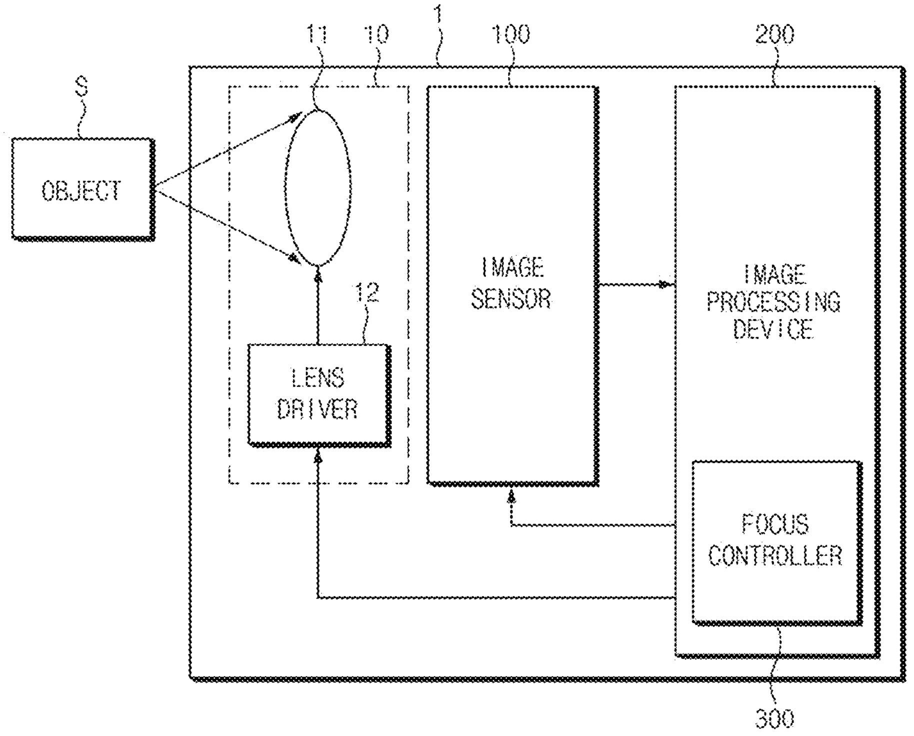
FIG. 1 is a block diagram illustrating an example of an imaging device based on some implementations of the disclosed technology.

This patent document provides implementations and examples of an image processing device and an imaging device including the same, and more particularly to technology relating to an image processing device for generating a parallax image required for autofocus, that may be used in configurations to substantially address one or more technical or engineering issues and to mitigate limitations or disadvantages encountered in some image processing devices in the art. Some implementations of the disclosed technology relate to an image processing device capable of accurately adjusting a focus position by analyzing textures and adding appropriate weights when synthesizing pixel values of respective color pixels to generate a parallax image for autofocus, and an imaging device including the same. In recognition of the issues above, the image processing device and the imaging device including the same based on some implementations of the disclosed technology can reduce texture noise and improve the degree of autofocus precision by controlling weights to preserve an edge region when pixel values of respective color pixels are synthesized.

Reference will now be made in detail to some embodiments of the disclosed technology, examples of which are illustrated in the accompanying drawings. Wherever possible, the same reference numbers will be used throughout the drawings to refer to the same or like parts. While the disclosure is susceptible to various modifications and alternative forms, specific embodiments thereof are shown by way of example in the drawings. However, the disclosure should not be construed as being limited to the embodiments set forth herein.

Hereinafter, various embodiments will be described with reference to the accompanying drawings. However, it should be understood that the disclosed technology is not limited to specific embodiments, but includes various modifications, equivalents and/or alternatives of the embodiments. The embodiments of the disclosed technology may provide a variety of effects capable of being directly or indirectly recognized through the disclosed technology.

FIG. 1 is a block diagram illustrating an example of an imaging device 1 based on some implementations of the disclosed technology. The imaging device 1 (e.g., a camera) may capture a photo image (or moving images) of a target object by collecting light reflected from the target object. A method for performing the autofocus (AF) function by the imaging device 1 will hereinafter be described with reference to FIG. 1.

Referring to FIG. 1, the imaging device 1 may refer to a device, for example, a digital still camera for photographing still images or a digital video camera for photographing moving images. For example, the imaging device 1 may be implemented as a Digital Single Lens Reflex (DSLR) camera, a mirrorless camera, or a smartphone, and others. The imaging device 1 may include a device provided with a plurality of camera modules, each of which has both a lens and an image pickup element, such that the device can capture (or photograph) a target object and can thus create an image of the target object.

Referring to FIG. 1, the imaging device 1 may include an imaging circuit 10, an image sensor 100, and an image processing device 200.

In this case, the imaging circuit 10 may be a component that receives light. In more detail, the imaging circuit 10 may include a lens 11 and a lens driver 12.

The lens 11 may converge light that is reflected from the target object S and reaches the imaging device 1. While FIG. 1 shows the single lens, other implementations are also possible. For example, in some implementations, a lens assembly can be provided, which include a plurality of lenses aligned in the optical axis direction. As the position of the lens 11 is adjusted, the focus on the target object S may change. The position of the lens 11 may be based on signals generated from pixels of the image sensor 100.

The lens driver 12 may control the position of the lens 11 based on a control signal from the image processing device 200. In some implementations, the lens driver 12 may adjust a focal distance by adjusting the position of the lens 11, and may perform operations such as autofocus, zoom change, and focus change. As the position of the lens 11 is adjusted, the distance between the lens 11 and the target object S can be adjusted. For example, the lens driver 12 may move the lens 11 in a direction parallel to the optical axis direction.

The image sensor 100 may include a pixel array (to be described later) in which a plurality of unit pixels is arranged in rows and columns. For example, the plurality of unit pixels is arranged in a grid shape. The image sensor 100 may generate a digital signal (or electrical signal) based on light reflected from the target object, and may generate digital image data (hereinafter referred to as "image data") based on the electrical signal. Incident light (i.e., optical signal) that has penetrated the lens 11 may be imaged in the pixel array and may be converted into an electrical signal. Each of the unit pixels (to be described later) may generate an electrical signal corresponding to the external object S.

In various embodiments, the image sensor 100 may include a photodiode (PD), a transfer transistor, a reset transistor, and a floating diffusion node (FD). The photodiode (PD) may generate and accumulate photocharges corresponding to the optical image of the target object S. While the photodiode (PD) is mentioned as the element of the image sensor 100, any photoelectric conversion element can be used without being limited to the photodiode as long as the photoelectric conversion elements converts an optical signal or incident light to an electrical signal. For example, the photoelectric conversion element may include, e.g., a photodiode, a photo transistor, a photo gate, or other photosensitive circuitry capable of converting light into a pixel signal (e.g., a charge, a voltage or a current). The transfer transistor may transmit photocharges focused on the photodiode (PD) to the floating diffusion node (FD) in response to a transfer signal. The reset transistor may discharge charges stored in the floating diffusion node (FD) in response to a reset signal. Before the reset signal is applied to the image sensor, charges stored in the floating diffusion node (FD) can be output. At this time, correlated double sampling (CDS) processing may be performed, and CDS-processed analog signals may be converted into digital signals through analog-to-digital conversion (ADC) processing and/or analog front end (AFE) processing. An example of the image sensor 100 according to the disclosed technology may be configured such that four photodiodes are allocated to a unit pixel corresponding to a single microlens (for example, a four-photodiode (4PD) pixel structure).

The unit pixels may be arranged in a matrix form in a pixel array. Each of the electrical signals generated by the unit pixels may include an image signal and a phase signal for the target object S. In this case, the image signal may be a signal generated in response to light from the target object S incident on the image sensor 100, and may be used as a signal to generate an image of the target object S. In addition, the phase signal may be a signal generated in response to light from the target object S incident on the image sensor 100, and may be used as a signal to adjust the distance between the target object S and the lens 11. The unit pixels may be classified into phase-difference detection pixels or image detection pixels depending on the output signals thereof. For example, the phase difference detection pixels refer to the unit pixels outputting the phase signals and the image detection pixels refer to the unit pixels outputting the image signals.

The phase-difference detection pixels may be arranged in an (N×N) matrix shape (where 'N' is a natural number or a positive integer of 2 or greater). The image detection pixels may be arranged adjacent to the phase-difference detection pixels. A structure of the unit pixels will be described below in more detail with reference to FIG. 2.

The image processing device 200 may obtain image information, etc. based on signals output from the image detection pixels. The image processing device 200 may obtain phase information, etc. based on signals output from the phase-difference detection pixels.

In some implementations, the image processing device 200 may receive image data from the image sensor 100 and may generate phase data (phase images). In addition, the image processing device 200 may process a phase difference calculation to be used in the autofocus operation based on phase data. The image processing device 200 may obtain the position and direction of a focus and the distance between the target object S and the imaging device 1 through such phase difference calculation. The image processing device 200 may provide a driving signal for adjusting the position of the lens 11 to the lens driver 12 based on a result of the phase difference calculation.

The image processing device 200 may perform various image data processes for improving the image quality, for example, remosaic processing, noise reduction, gain adjustment, waveform shaping, analog-to-digital conversion (ADC), interpolation, a white balance process, a gamma process, and/or an edge sharpening process, etc. In some implementations, the image processing device 200 may change a region of interest (ROI) for the image based on information about the detected focus and information about the image of the target object.

In some implementations, the image processing device 200 may include a focus controller 300. In some other implementations, the focus controller 300 may be implemented independently from the image processing device 200.

The focus controller 300 may determine a weight so that an edge region is preserved when generating a luminance image used for autofocus adjustment by synthesizing pixel values of pixels. The luminance image for autofocus generated by the focus controller 300 may be output to the lens driver 12 and used as a driving signal for determining a focus position. The focus controller 300 may adjust the position of the lens 11 to make the disparity "0" based on the luminance image for autofocus. For example, the image processing device 200 may store the luminance image for autofocus generated by the focus controller 300, parallax information, and lens driving amount, etc. in a look-up table of a memory, and may control the lens driver 12 using the data stored in the look-up table.

Although the embodiment of FIG. 1 shows that the image processing device 200 is provided outside the image sensor 100, other implementations are also possible. For example, the image processing device 200 can be provided inside the image sensor 100 or separately provided outside the image sensor 100.

The image sensing device may include a phase-difference detection autofocus (PDAF) function that automatically focuses based on an operation using the phase difference detection for detecting a phase difference in light received by adjacent phase-difference detection pixels . . . . The phase-difference detection autofocus (PDAF) method may measure an offset direction and an offset amount from a central image acquired through the image sensing device by using the phase difference between two or more different measurement points.

When there is no phase difference between signals generated by the phase-difference detection pixels included in the image sensor 100, the distance between the lens 11 and the target object S may be referred to as being at "in-focus position". When the distance between the lens 11 and the target object S is at the in-focus position, the magnitudes of incident lights that have reached the unit pixels after passing through one microlens may be equal to each other, so that the magnitudes of signals respectively detected from the unit pixels sharing one microlens may also be equal to each other. For example, when the position of the lens 11 and the target object S are at the in-focus position, the phase difference between the phase signals detected by the phase-difference detection pixels included in the pixel array becomes zero.

If the distance between the lens 11 and the target object S is not at the in-focus position, a difference may occur between signals generated by the phase-difference detection pixels. The magnitude of incident light reaching each unit pixel may vary depending on the positions of the unit pixels within the pixel group. This is because a path difference may occur in the incident light passing through the microlens.

Accordingly, when the distance between the lens 11 and the target object S is not at the in-focus position, the magnitudes of the phase signals of the respective unit pixels collected by the image processing device 200 may be different from each other. When the distance between the lens 11 and the target object S is not at the in-focus position, the image processing device 200 may generate phase data by calculating a difference in magnitude between phase signals.

The image processing device 200 may provide a driving signal to the lens driver 12 based on such phase data. Based on the driving signal provided from the image processing device 200, the lens driver 12 may move the lens 11 so that the distance between the lens 11 and the target object S is at the in-focus position.

In order to improve the autofocus (AF) performance in high-resolution images, image sensing devices, each of which has a structure in which one microlens is applied to a plurality of pixels, are being developed. A pixel array structure in which multiple pixels of the same color are arranged adjacently and one microlens is applied to the multiple pixels will hereinafter be described in more detail with reference to FIG. 2.

Since the focus position of the image sensing device changes depending on the position of the target object(S), the image sensing device may perform focusing using a parallax obtained from the selected ROI (region of interest). The image sensing device having a structure in which one microlens is applied to multiple pixels may generate a luminance image to be used for autofocus adjustments by synthesizing pixel values of respective color pixels. However, when detecting a change between pixel values in the edge region between respective colors to generate a parallax image to be used for autofocus adjustments, the edge region may not be preserved depending on the color of each color pixel. In this case, it may be difficult to accurately perform autofocusing.

Therefore, the focus controller 300 based on some implementations of the disclosed technology may determine a weight so that the edge region is preserved when generating a luminance image to be used for autofocus adjustments by synthesizing pixel values of pixels (e.g., R (Red), G (Green), and B (Blue) pixels). A method for generating a texture signal by controlling weights so that the edge region is preserved will be described in more detail with reference to FIGS. 2 to 10C.

Figure 2:
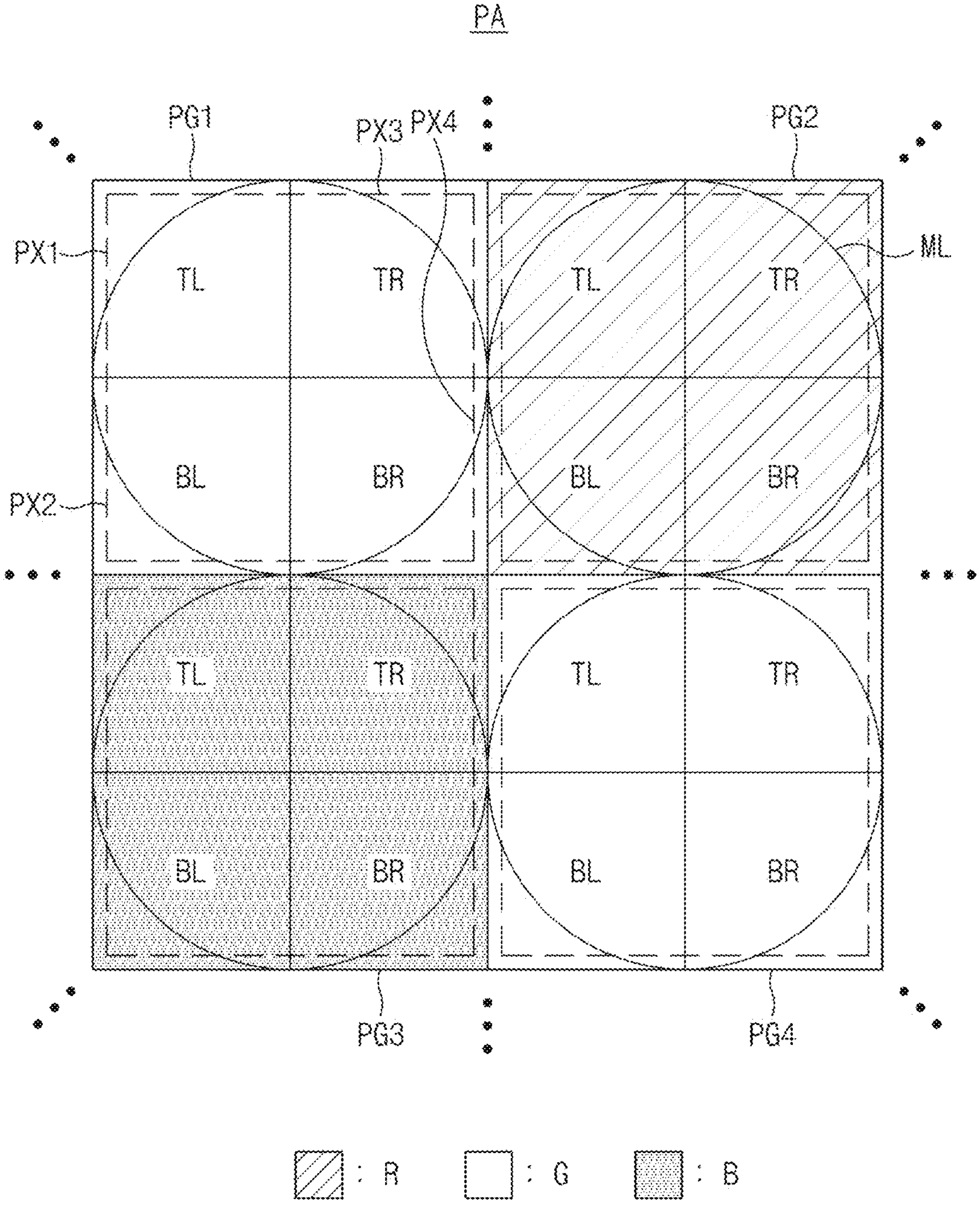
FIG. 2 is a diagram illustrating an example structure of a pixel array included in an image sensor shown in FIG. 1 based on some implementations of the disclosed technology.

FIG. 2 is a diagram illustrating an example structure of a pixel array included in the image sensor 100 shown in FIG. 1 based on some implementations of the disclosed technology.

Referring to FIG. 2, 16 unit pixels arranged in a matrix including 4 rows and 4 columns are shown. For example, 16 unit pixels are a minimum unit of the pixel array (PA), and the 16 unit pixels may be repeated in the row and column directions. However, the pixel arrangement is not limited to thereto and other implementations are also possible.

The pixel array (PA) of the image sensor 100 may include pixel groups (PG1~PG4). The pixel groups (PG1~PG4) may be arranged in an (N×N) matrix (where 'N' is a natural number of 2 or greater). The pixel groups (PG1, PG4) may be arranged diagonally from each other, and the pixel groups (PG2, PG3) may be arranged diagonally from each other.

One microlens ML (which may correspond to the lens 11 of FIG. 1) may be formed in each of the pixel groups (PG1~PG4). For example, since four unit pixels (PX1~PX4) share one microlens (ML), this shared structure may be referred to as an A4C (All 4-coupled) structure. The microlens (ML) may adjust the path of light incident upon the image sensor 100.

Each of the pixel groups (PG1~PG4) may have four unit pixels (PX1~PX4) having the same color, and the four unit pixels (PX1~PX4) are arranged adjacent to each other in an (N×N) matrix (where 'N' is a natural number of 2 or greater). When four light reception elements are placed in each of the pixel groups (PG1~PG4), the four light reception elements may be arranged symmetrically in the upper right/upper left/lower right/lower left directions based on the center of each pixel group. The four light reception elements may correspond to the four unit pixels (PX1~PX4), respectively.

For example, the pixel group PG1 may include four unit pixels each having a green (Gr) color filter. The pixel group PG2 may include four unit pixels each having a red (R) color filter. Additionally, the pixel group PG3 may include four unit pixels each having a blue (B) color filter. The pixel group PG4 may include four unit pixels each having a green (Gb) color filter.

That is, each of the pixel groups (PG1~PG4) may include four unit pixels (PX1~PX4). Each of the unit pixels (PX1~PX4) may include one photoelectric conversion element (not shown) corresponding to each unit pixel. Colors (i.e., red (R), green (Gr, Gb), blue (B)) corresponding to pixel groups (PG1~PG4) may be arranged in a Bayer pattern. Accordingly, raw images generated by capturing images by the image sensor 100 may include color image pixels arranged in a structure similar to the above-described pixel array (PA). The repetitive arrangement structure and pattern of the pixel array (PA) are not limited thereto and may vary depending on the embodiments.

The positions where the red pixel, blue pixel, and/or green pixel are placed within each pixel group (PG1~PG4) may be equal to each other to reduce the amount of calculation required for image signal processing by the image processing device 200, but the scope or spirit of the disclosed technology is not limited thereto. Additionally, although the present embodiment has disclosed that each of the pixel groups (PG1~PG4) includes four unit pixels (PX1~PX4) for convenience of description, the number of unit pixels included in each pixel group is not limited thereto.

The pixel array (PA) may include phase-difference detection pixels and image detection pixels. Here, the image detection pixels may generate signals corresponding to the target object(S) of FIG. 1. In addition, the phase-difference detection pixels may be used to capture an image of the target object(S) and generate phase signals for autofocus. Each of the phase signals may include information about the position of the unit pixel (that generates the phase signal) on the pixel array (PA). The phase signals may be transmitted to the image processing device 200 and may be used to detect the distance between the target object S and the lens 11.

In some implementations, the autofocus operation through phase detection may detect a phase difference between a first image generated by some pixels among the phase-difference detection pixels and a second image generated by some other pixels, may calculate a movement distance of the lens based on the detected phase difference, may adjust the position of the lens based on the calculated movement distance, and may thus obtain an in-focus image.

In some implementations, the pixel group (PG1) among the pixel groups (PG1~PG4) of the pixel array (PA) may be set as the phase-difference detection pixels (PX1~PX4), but the positions of the phase-difference detection pixels are not limited thereto. In addition, the remaining pixel groups (PG2~PG4) among the pixel groups (PG1~PG4) of the pixel array (PA) may be set as the image detection pixels, but the positions of the image detection pixels are not limited thereto.

In FIG. 2, each pixel group (PG1~PG4) includes unit pixels (PX1~PX4), which are also indicated as TL, BL, TR, BR. The reference characters, TL, BL, TR, BR, may indicate the positions of the four unit pixels within the corresponding pixel group (PG), respectively. For example, in each pixel group (PG1~PG4), the position of the unit pixel (PX1) located at the upper left corner will hereinafter be referred to as "TL (Top Left)", and the position of the unit pixel (PX2) located at the lower left corner will hereinafter be referred to as "BL (Bottom Left)". In addition, the position of the unit pixel (PX3) located at the upper right corner of each pixel group (PG1~PG4) will hereinafter be referred to as "TR (Top Right)", and the position of the unit pixel (PX4) located at the lower right corner will hereinafter be referred to as "TR (Top Right)".

Figure 3:
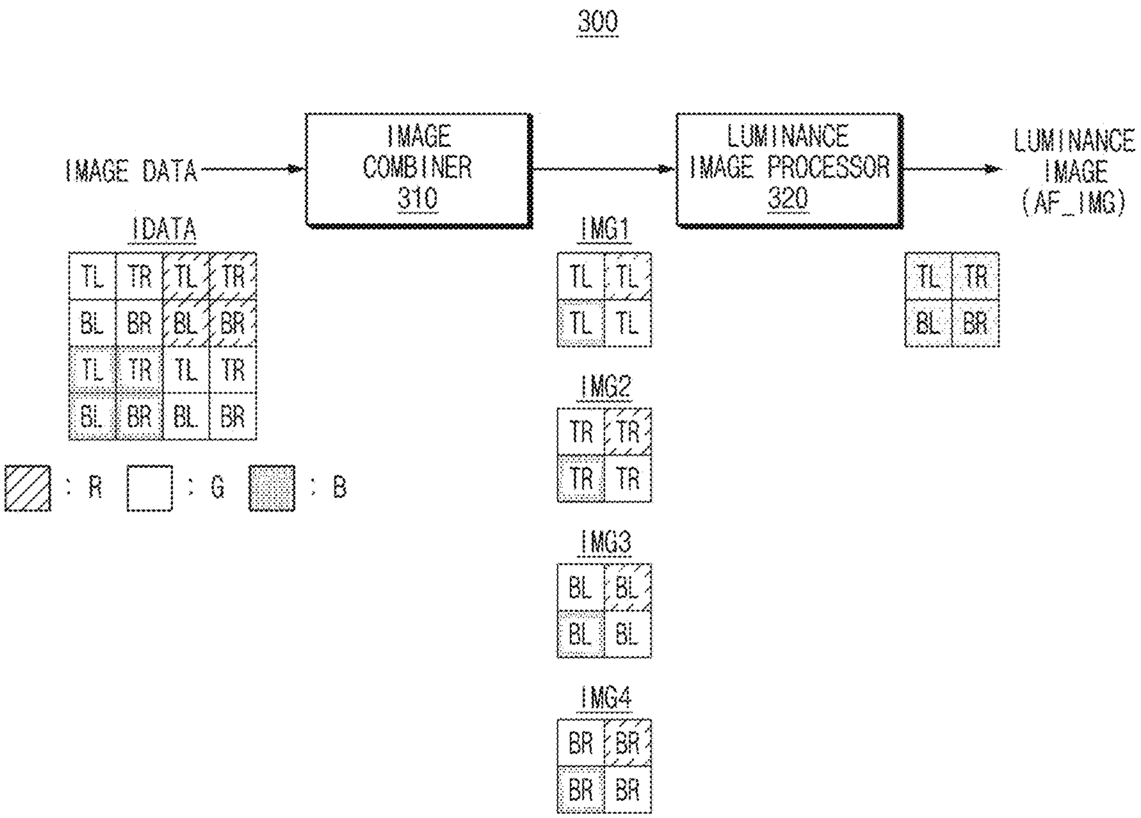
FIG. 3 is a schematic diagram illustrating an example of a focus controller shown in FIG. 1 based on some implementations of the disclosed technology.

FIG. 3 is a schematic diagram illustrating an example of the focus controller 300 shown in FIG. 1 based on some implementations of the disclosed technology.

Referring to FIG. 3, the focus controller 300 may include an image combiner 310 and a luminance image processor 320.

Here, the image combiner 310 may combine image data (IDATA) received from the image sensor 100 to output a plurality of color images (IMG1~IMG4). The image data (IDATA) applied to the image combiner 310 may have a format corresponding to the pixel array (PA) illustrated in FIG. 2 described above.

In some implementations, the image combiner 310 may separate the image data (IDATA) for each of the pixel groups (PG1~PG4), may collect the unit pixels arranged at the same positions, may combine pixel data of the collected unit pixels, and may thus generate four color images (IMG1~IMG4) based on the result of combining the pixel data. In some implementations, the pixel group PG1 and the pixel group PG4 may have the same green color (G), while the pixel group PG1 and the pixel group PG4 can be arranged at different positions from each other within a single Bayer pattern.

For example, in the present embodiment, the green color (G) may be divided into a first green (Gr) color and a second green (Gb) color, and the Gr color and the Gb color, which are divided from the green color (G) may be treated as different colors. In addition, in some implementations of the disclosed technology, the image combiner 310 is described as an example of separating four channels to generate four color images (IMG1~IMG4), but the number of color images can be changed depending on the position of each unit pixel without being limited thereto.

For example, a color image (IMG1) may be generated by gathering pixels (TLs) arranged in top left (TL) zones of the respective pixel groups (PG1~PG4) of the image data (IDATA). A color image (IMG2) may be generated by gathering pixels (TRs) arranged in top right (TR) zones of the respective pixel groups (PG1~PG4) of the image data (IDATA). A color image (IMG3) may be generated by collecting (gathering) pixels (BLs) arranged in the bottom left (BL) zones of the respective pixel groups (PG1~PG4) of the image data (IDATA). The pixels (BRs) arranged in the bottom right (BR) zones of the respective pixel groups (PG1~PG4) of the image data (IDATA) may be collected to generate a color image (IMG4).

In addition, the luminance image processor 320 may process the four color images (IMG1~IMG4) received from the image combiner 310 into data for luminance to generate a luminance image (AF_IMG) to be used for autofocus adjustments.

In some implementations, the photoelectric conversion signal of each light reception element included in each of the unit pixels (PX1~PX4) may include phase difference information of each unit pixel. The photoelectric conversion signals that are output in a state where the light reception elements of the unit pixel are arranged in the different portions of the pixel group, e.g., along upper, lower, left, and right directions, may represent a phase difference of light incident at different incident angles on individual light reception elements. In order to reduce the amount of data storage (or the data storage size), phase difference data including the phase difference information may be output to include luminance (Y) information only, among the data types of YCbCr for expressing the color space, while not including color information of Cb/Cr. An image including this luminance information may be output as a luminance image (AF_IMG) to be used for autofocus adjustments.

For example, the luminance image processor 320 may convert data of the color image (IMG1) into luminance data to generate one TL luminance image. The luminance image processor 320 may convert data of the color image (IMG2) into luminance data to generate one TR luminance image. The luminance image processor 320 may convert data of the color image (IMG3) into luminance data to generate one BL luminance image. The luminance image processor 320 may convert data of the color image (IMG4) into luminance data to generate one BR luminance image. The above-described TL luminance image, TR luminance image, BL luminance image, and BR luminance image may be output as a luminance image (AF_IMG) for autofocus (hereinafter referred to as an autofocus luminance image AF_IMG).

In some implementations, the luminance image processor 320 may generate the luminance image (AF_IMG), for example, by separating and synthesizing the unit pixels arranged at the same positions of corresponding pixel groups of the pixel array. However, the scope of the present embodiment is not limited thereto, and the luminance image (AF-_IMG) may be generated in other various ways.

However, in a situation where there is an edge region (or texture) between two different color images, when two color images are synthesized to generate the luminance image (AF_IMG), the edge of the luminance image (AF_IMG) may not be preserved. Accordingly, the luminance image processor 320 according to the present embodiment may control a weight so that the edge can be preserved by analyzing the texture of the image when synthesizing color images having different colors to generate the luminance image (AF_IMG) to be used for autofocus adjustments. The operation of the luminance image processor 320 will hereinafter be described in more detail with reference to FIGS. 4 to 10C.

Figure 4:
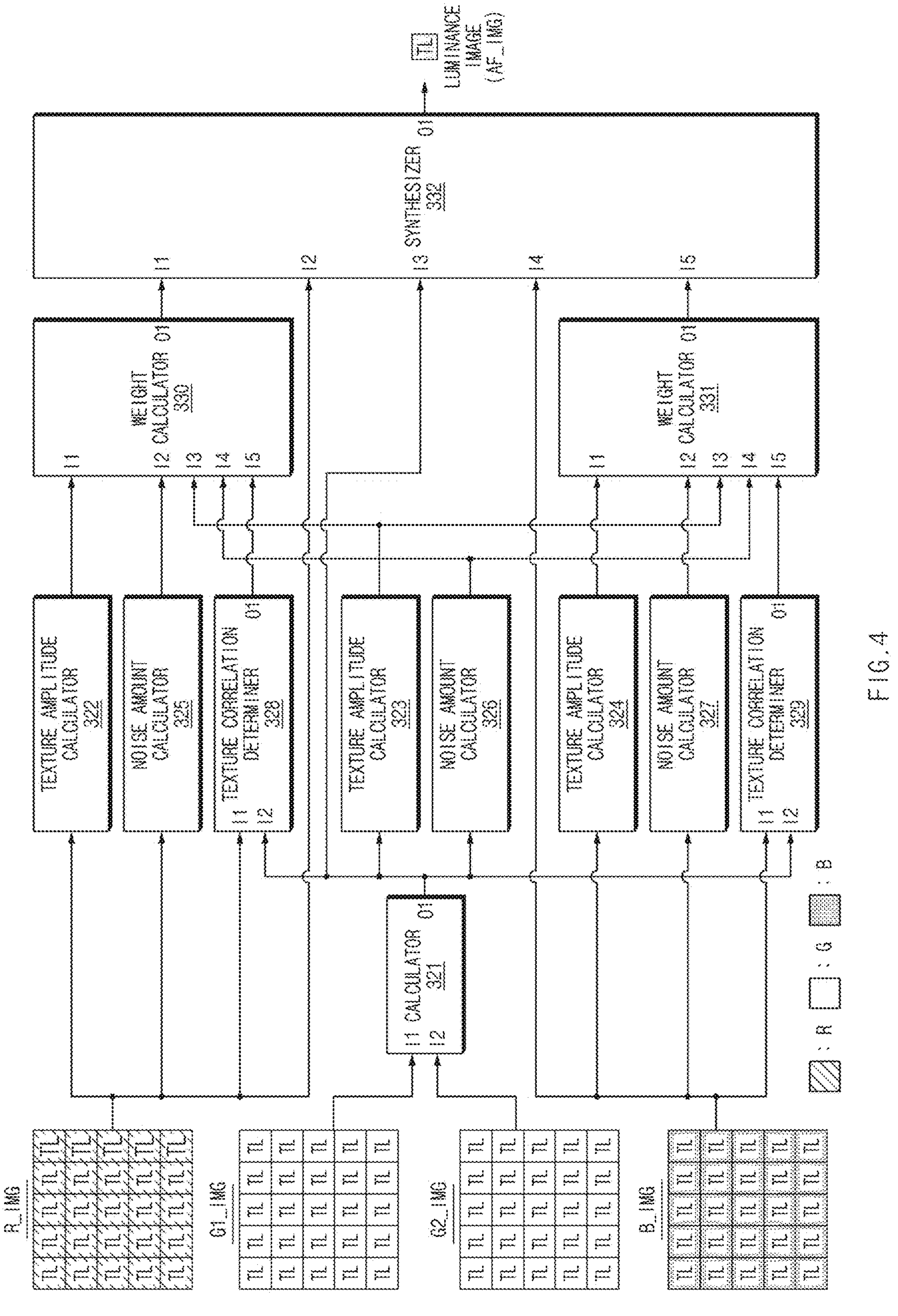
FIG. 4 is a schematic diagram illustrating an example of a luminance image processor shown in FIG. 3 based on some implementations of the disclosed technology.
Figure 5:
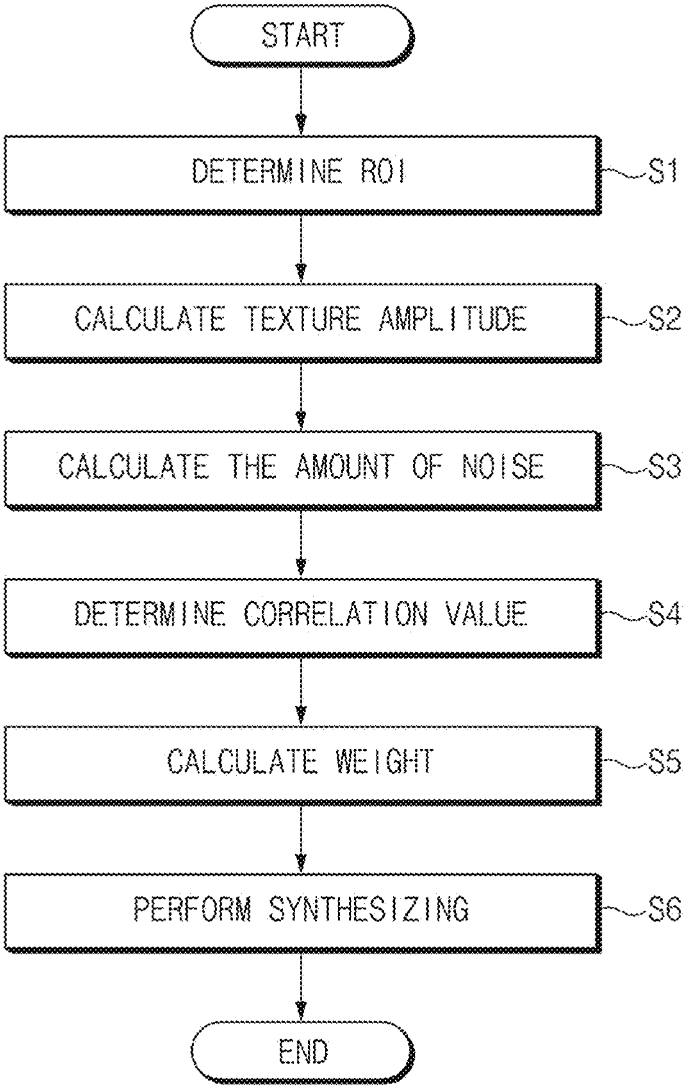
FIG. 5 is a flowchart illustrating an example operation of the luminance image processor shown in FIG. 3 based on some implementations of the disclosed technology.

FIG. 4 is a schematic diagram illustrating an example of the luminance image processor 320 shown in FIG. 3 based on some implementations of the disclosed technology. FIG. 5 is a flowchart illustrating an example operation of the luminance image processor 320 shown in FIG. 3 based on some implementations of the disclosed technology. The operation of the luminance image processor 320 shown in FIG. 4 will be described with reference to the flowchart of FIG. 5.

Referring to FIG. 4, the luminance image processor 320 may include a calculator 321, a plurality of texture amplitude calculators (322~324), a plurality of noise amount calculators (325~327), a plurality of texture correlation determiners (328, 329), a plurality of weight calculators (330, 331), and a synthesizer 332.

As described above with reference to FIG. 3, four color images (IMG1~IMG4) may be input to the luminance image processor 320. In the embodiment of FIG. 4, an example of receiving the color image (IMG1) among these four color images (IMG1~IMG4) and generating a TL luminance image will hereinafter be described with reference to FIG. 4. The configuration and operation of receiving the remaining color images (IMG2~IMG4) and generating TR, BL, and BR luminance images are the same as those of FIG. 4, and as such redundant description thereof will herein be omitted for brevity.

The luminance image processor 320 may receive a first image (R_IMG), a second image (G1_IMG), a third image (G2_IMG), and a fourth image (B_IMG). Here, the first image (R_IMG), the second image (G1_IMG), the third image (G2_IMG), and the fourth image (B_IMG) may correspond to the color image (IMG1). The first to fourth images (R_IMG, G1_IMG, G2_IMG, B_IMG) may include not only the target pixel (TL) that is located at a position of the processing target and corresponds to the color image (IMG1), but also peripheral pixels that are located around the target pixel (TL) and have the same colors.

For example, the first image (R_IMG) may include TL pixels of red color (R), which are arranged in a (5×5) matrix. The second image (G1_IMG) may include TL pixels of green color (G), which are arranged in a (5×5) matrix. The third image (G2_IMG) may include TL pixels of green color, which are arranged in a (5×5) matrix. The fourth image (B_IMG) may include TL pixels of blue color, which are arranged in a (5×5) matrix.

In some implementations, the first to fourth images (R_IMG, G1_IMG, G2_IMG, B_IMG) may be set as ROIs (Regions of Interest) (operation S1). The ROIs may be arbitrarily set at various positions of the image sensor. The number of ROIs, the size of each ROI (i.e., the number of pixels included in each ROI), and the position of each ROI may be changed without being limited thereto.

The calculator 321 may generate an average image by calculating pixel values of the second image (G1_IMG) and the third image (G2_IMG). For example, the calculator 321 may average the pixel values of the second image (G1_IMG) and the third image (G2_IMG) and may output an average value of the green pixels.

Each of the plurality of texture amplitude calculators (322~324) may calculate the amplitude for a luminance level of a texture image (operation S2). The texture amplitude calculator 322 may calculate the amplitude of texture of the red pixels included in the first image (R_IMG). The texture amplitude calculator 323 may calculate the amplitude of texture of the green pixels included in the output image of the calculator 321. The texture amplitude calculator 324 may calculate the amplitude of texture of the blue pixels included in the fourth image (B_IMG).

Here, the "amplitude" of the texture may be an indicator (index) indicating the degree of a contrast difference between two regions that have different luminance levels and are in contact with each other from among the plurality of textures. For example, if the texture is an edge region, the amplitude of the texture may be calculated based on an absolute value of the difference between a bright area and a dark area. In another example, if the texture is a complex texture, the amplitude of the texture may be calculated using a difference between the maximum and minimum values within the texture region. In another example, in order to improve noise resistance, the texture amplitude may be calculated by obtaining the difference between a maximum value and a minimum value using an average filter, etc. In another example, the luminance (contrast) of the texture may be calculated using a variance of pixel values, etc. as an indicator (index).

In addition, the plurality of noise amount calculators (325~327) may calculate the noise amount of each pixel included in the first to fourth images (R_IMG, G1_IMG, G2_IMG, B_IMG) (operation S3). The noise amount calculator 325 may calculate the noise amount of the first image (R_IMG). The noise amount calculator 326 may calculate the noise amount from the output image of the calculator 321. The noise amount calculator 327 may calculate the noise amount of the fourth image (B_IMG).

Here, the amount of noise in the texture region within the first to fourth images (R_IMG, G1_IMG, G2_IMG, B_IMG) may represent a noise variance or a noise standard deviation, etc. For example, the average pixel value in the texture region may be obtained and the sensor gain at the time of image capturing (shooting) may be additionally set. In this way, the noise variance may be estimated by obtaining information on the extent of noise variance for the average pixel value, gain value, etc. In addition, a noise standard deviation may be obtained by calculating a standard deviation of image data generated in a state where light incident upon the image sensing device is completely blocked during the test process for the image sensing device.

In addition, the plurality of texture correlation determiners 328 and 329 may calculate a texture correlation value between two images based on the first image (R_IMG), the fourth image (B_IMG) and the output image of the calculator 321 (operation S4). In some implementations, the texture correlation determiner 328 may calculate a texture correlation value between the first image (R_IMG) and the output image of the calculator 321. In addition, the texture correlation determiner 329 may calculate a texture correlation value between the fourth image (B_IMG) and the output image of the calculator 321.

For example, the first image (R_IMG) may correspond to a red pixel and the output image of the calculator 321 may correspond to a green pixel. The texture correlation determiner 328 may determine whether the texture of the red pixel and the green pixel has a positive (+) correlation value or a negative (−) correlation value. In addition, the fourth image (B_IMG) may correspond to a blue pixel and the output image of the calculator 321 may correspond to a green pixel. The texture correlation determiner 329 may determine whether the texture of the blue pixel and the green pixel has a positive (+) correlation value or a negative (−) correlation value. The operation of determining the texture correlation value by the texture correlation determiners (328, 329) will be described in more detail with reference to FIGS. 6A and 6B.

In some implementations, the plurality of weight calculators (330, 331) may calculate weights based on the output signals of the texture amplitude calculators (322~324), the noise amount calculators (325~327), and the texture correlation determiners (328, 329) (operation S5). The weight calculator 330 may calculate weights based on the output signals of the texture amplitude calculators (322, 323), the noise amount calculators (325, 326), and the texture correlation determiner 328. The weight calculator 331 may calculate weights based on the output signals of the texture amplitude calculators (323, 324), the noise amount calculators (326, 327), and the texture correlation determiner 329. The operation of calculating weights by the weight calculators (330, 331) will be described in more detail with reference to FIGS. 7A to 10C.

In some implementations, the synthesizer 332 may generate a luminance image for autofocus (AF_IMG) by synthesizing the first image (R_IMG), the output image of the calculator 321, and the fourth image (B_IMG) using the weights calculated by the weight calculators (330, 331) (operation S6).

Figure 6A:
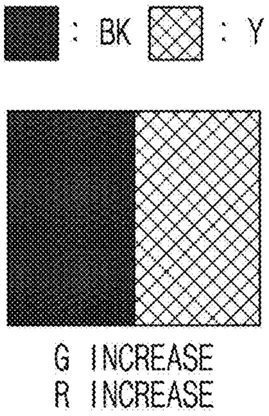
FIGS. 6A and 6B show diagrams illustrating an example operation of texture correlation determiners shown in FIG. 3 based on some implementations of the disclosed technology.
Figure 6B:
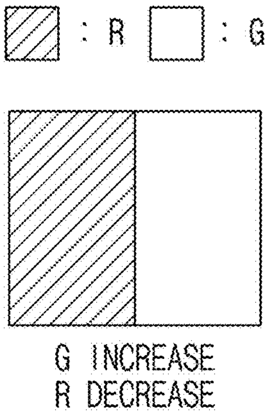

FIGS. 6A and 6B show diagrams illustrating an example operation of the texture correlation determiners shown in FIG. 3 based on some implementations of the disclosed technology.

Referring to FIGS. 6A and 6B, the texture correlation determiners (328, 329) may calculate a texture correlation value by determining whether the pixel value increases or decreases in the edge region of textures having two different colors.

FIG. 6A shows an example that an edge or gradation that changes from a black color (BK) to a yellow color (Y). In the example as shown in FIG. 6A, while the value of the G pixel increases, the value of the R pixel also increases at the same time, which allows the edge or gradation to have a positive (+) correlation. Here, the example case where the correlation value between two regions that have different colors and are in contact with each other is a positive (+) value may hereinafter be referred to as "positive correlation".

FIG. 6B shows another example that the edge or gradation that changes from the red color (R) to the green color (G). In the example as shown in FIG. 6B, while the value of the R pixel decreases, the value of the G pixel increases, which allows the edge or gradation to have a negative (−) correlation. Here, the example case where the correlation value between two regions that have different colors and are in contact with each other is a negative (−) value may hereinafter be referred to as "negative correlation".

In this way, the texture correlation determiners (328, 329) may use the correlation value (or correlation coefficient) as an indicator (index), which is obtained by quantifying the correlation. The texture correlation determiners (328, 329) may determine the texture correlation by determining whether the correlation coefficient has a positive (+) value or a negative (−) value.

For example, the method for determining such correlation may include calculating the pixel average values of the R image and the G image within the ROI (region of interest), calculating a deviation (difference from the average value) for each pixel with respect to the R image and the G image, and determining the sign of the calculated deviation.

$$\mathrm{sign}\left(\sum_i (R_i - \bar{R})(G_i - \bar{G})\right) \quad \text{[Equation 1]}$$

The above-described operation can be represented by Equation 1.

$$\mathrm{sign}\left[\sum_i \{\mathrm{sign}((R_i - \bar{R})(G_i - \bar{G}))\}\right] \quad \text{[Equation 2]}$$

In another example, the correlation may also be determined by using a majority vote of the signs of the respective pixels of the R image and the G image, as in Equation 2 above.

FIGS. 7A to 9C are diagrams illustrating example operations of the weight calculators shown in FIG. 4 based on some implementations of the disclosed technology.

Figure 7A:
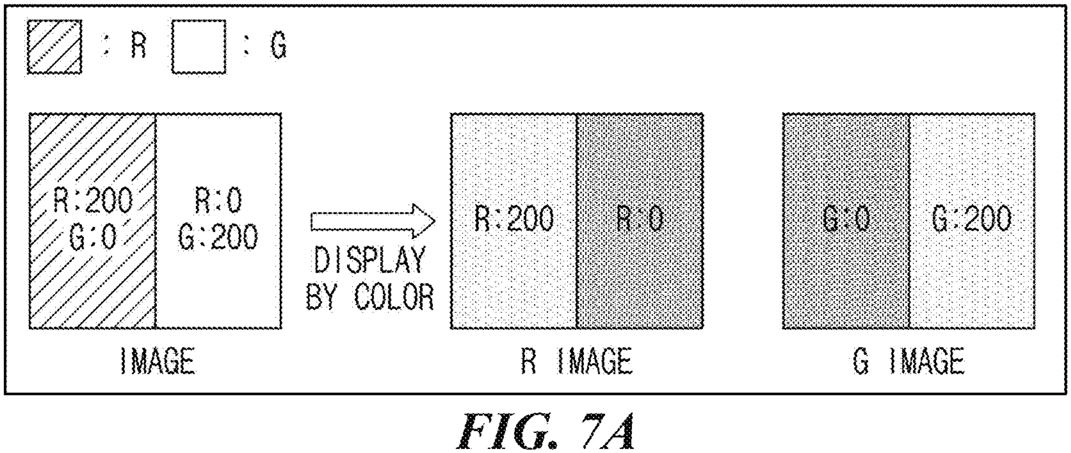
FIGS. 7A to 7C show diagrams illustrating example operations of weight calculators as shown in FIG. 4 when an image includes a red region and a green region based on some implementations of the disclosed technology.

The image of FIG. 7A may include a red region and a green region. When the red region and the green region are displayed by color, the red region and the green region can be distinguished as a red (R) image and a green (G) image, respectively. In the case of the R image, the pixel value may decrease from 200 to 0 in the direction from the left side to the right side. In the case of the G image, the pixel value may increase from 0 to 200 in the direction from the left side to the right side. Thus, the pixel value of the R image decreases and the pixel value of the G image increases, which shows that the trends of the pixel values of the R image and the G image are opposite to each other. The trends of the pixel values of the R image and the G image may refer to whether the pixel values of the R image and the G image increase or decrease, respectively.

Figure 7B:
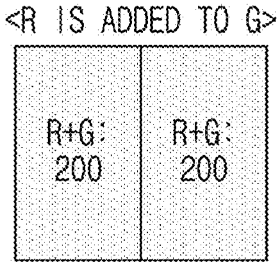

As shown in FIG. 7B, when the pixel value of the R image is added to the pixel value of the G image, the pixel values (i.e., R+G pixel values) of the R pixel and the G pixel are both 200, so that a difference between the pixel values in the left and right directions of the edge region may be zero '0'. In this case, the contrast difference between the left and right texture regions becomes zero '0', so that the autofocus operation cannot be performed.

Figure 7C:
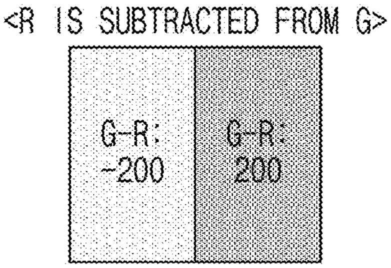

On the other hand, when the pixel value of the R image is subtracted from the pixel value of the G image as in FIG. 7C, the G-R pixel value on the left side becomes '-200' and the G-R pixel value on the right side becomes '200', so that a difference between pixel values on the left and right sides of the edge region may increase to '400'. In this case, a contrast difference between the left and right texture regions may increase to '400', so that such calculation result can be used for the autofocus operation.

In this way, the weight calculators (330, 331) may calculate a weight by performing a subtraction operation when the trend of the pixel value of the R image, which indicates whether the pixel value of the R image increases or decreases, is opposite to the trend of the pixel value of the G image, which indicates whether the pixel value of the G image increases or decrease. In other words, when the trends of the pixel values in the edge regions of the R image and the G image are different from each other, e.g., i) the pixel values in the edge regions of the R image increases but the pixel values in the edge regions of the G image decreases, or ii) the pixel values in the edge regions of the R image decreases but the pixel values in the edge regions of the G image increases, if the weight of the G image is a positive (+) value, the weight of the R image may be set to a negative (−) value, so that the weights of the R and G images can be calculated. Thus, the weight may be calculated so that the subtraction is performed when the change in luminance of the R image is opposite to that of the G image.

Figure 8A:
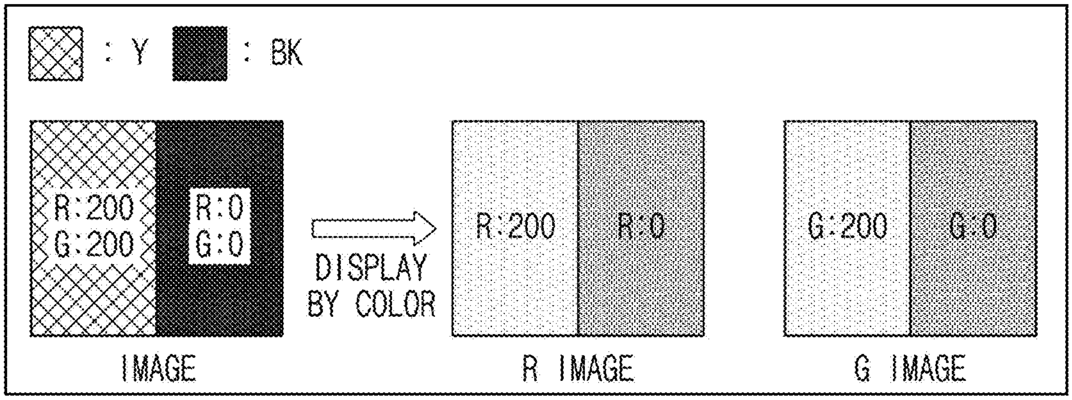
FIGS. 8A to 8C show diagrams illustrating example operations of weight calculators as shown in FIG. 4 when an image includes a yellow region and a black region based on some implementations of the disclosed technology.

The image of FIG. 8A may include a yellow region and a black region. The pixel values of the R pixel and the G pixel in the yellow region are both 200 and the pixel values of the R pixel and the G pixel in the black region are both 0. When the yellow region and the black region are displayed by color, the yellow region and the black region can be distinguished as the R image and the G image, respectively. In the case of the R image, the pixel value may decrease from 200 to 0 in the direction from the left side to the right side. Similarly, in the case of the G image, the pixel value may decrease from 200 to 0 in the direction from the left side to the right side. Thus, the pixel value of the R image and the pixel value of the G image decrease, which shows that the trends of the pixel values of the R image and the G image are equal to each other. The trends of the pixel values of the R image and the G image may refer to whether the pixel values of the R image and the G image increase or decrease, respectively.

Figure 8B:
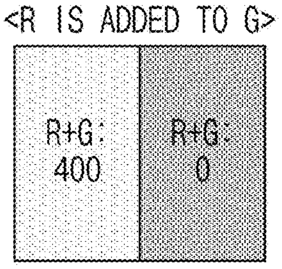

As shown in FIG. 8B, when the pixel value of the R image is added to the pixel value of the G image, the R+G pixel values on the left side become '400' and the R+G pixel values on the right side become zero '0', so that a difference between the pixel values on the left and right sides of the edge region may increase to '400'. In this case, the contrast difference between the left and right texture regions increases to '400', so that the resultant value can be used for the autofocus operation. In this way, the weight calculators (330, 331) may calculate the weight by performing the addition operation when the trend of the pixel value of the R image and the G image are same as each other, e.g., the pixel values in the R image decreases and the pixel values in the G images decreases.

Figure 8C:
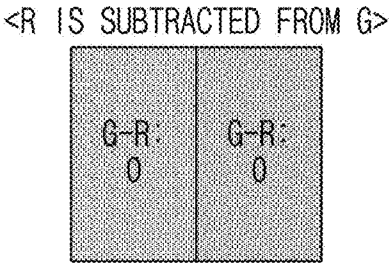

On the other hand, when the pixel value of the R image is subtracted from the pixel value of the G image as in FIG. 8C, the G-R pixel value all become zero '0', so that a difference between pixel values on the left and right sides of the edge region may become zero '0'. In this case, a contrast difference between the left and right texture regions becomes zero '0', so that the autofocus operation cannot be performed.

Figure 9A:
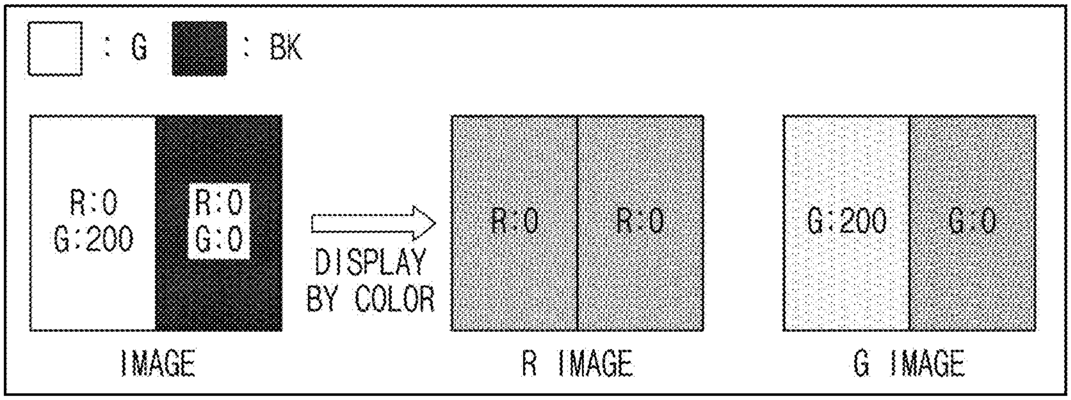
FIGS. 9A to 9C show diagrams illustrating example operations of weight calculators as shown in FIG. 4 when an image includes a green region and a black region based on some implementations of the disclosed technology.

The image of FIG. 9A may include a green region and a black region. The pixel values of the R pixel and the G pixel in the green region are 0 and 200, respectively, and the pixel values of the R pixel and the G pixel in the black region are both 0. When the green region and the black region are displayed by color, the green region and the black region can be distinguished as the R image and the G image, respectively. In the case of the R image, the pixel value remains at zero '0' without any change in the direction from the left side to the right side of the R image. In the case of the G image, the pixel value may decrease from 200 to 0 in the direction from the left side to the right side. Since there is no change in the pixel value of the R image and the pixel value of the G image decreases, the trends of the pixel values of the R image and the G images are different from each other but not opposite to each other. The trends of the pixel values of the R image and the G image may refer to whether the pixel values of the R image and the G image increase or decrease, respectively.

Figure 9B:
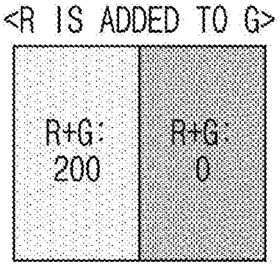

As shown in FIG. 9B, when the pixel value of the R image is added to the pixel value of the G image, the R+G pixel value on the left side becomes '200' and the R+G pixel value on the right side becomes zero '0', so that a difference in pixel value between the left and right sides of the edge region does not change compared to the other case where only the G image is used.

Figure 9C:
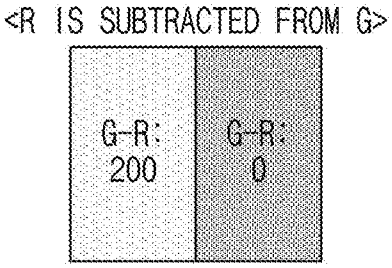

As shown in FIG. 9C, when the pixel value of the R image is subtracted from the pixel value of the G image, the G-R pixel value on the left side becomes '200' and the G-R pixel value on the right side becomes zero '0', so that a difference in pixel value between the left and right sides of the edge region does not change compared to the other case where only the G image is used.

In this case, the signal-to-noise ratio (SNR) of the texture may increase, making it difficult or impossible to perform the autofocus operation. A small signal-to-noise ratio (SNR) of the texture may mean that the amplitude of the texture (such as a contrast difference of the edge, etc.) is small as compared to the magnitude of noise. According to another embodiment, the weight calculators (330, 331) may set an absolute value of the weight to a small absolute value in order to reduce noise when the increase and decrease of the pixel value of the R image are equal to those of the G image and the difference in pixel value between the addition and subtraction operations of the R image is equal to those of the G image.

Hereinafter, a method for calculating weights by the weight calculators (330, 331) will be described with reference to the attached drawings.

In some implementations, Equation 3, Equation 4, and Equation 5 may represent examples of setting weights in some cases where the texture amplitude is calculated by using the difference between the maximum and minimum values in the texture region and the texture amplitude does not have a sign.

$$w_R = C_R \frac{|T_R| V_G}{|T_G| V_R} w_G \quad \text{[Equation 3]}$$

In Equation 3, WR may represent a weight in the R image, $T_R$ may represent the amplitude of the texture in the R image, and $V_R$ may represent the standard deviation of noise in the R image. In addition, CR may represent a parameter value that becomes '1' when the R image and the G image have a positive (+) correlation and becomes '-1' when the R image and the G image have a negative (−) correlation. In addition, $T_G$ may represent the amplitude of the texture in the G image, and $V_G$ may represent the standard deviation of the noise in the G image. In Equation 3, when the signal-to-noise ratio (SNR) of the texture is small, that is, when $T_R$ is small and $V_R$ is large, the weight may be reduced.

$$w_G = 1 \quad \text{[Equation 4]}$$

In Equation 4, $W_G$ may represent the weight in the G image, and the weight in the G image may be set to a value of 1 that is used as a reference value.

$$w_B = C_B \frac{|T_B| V_G}{|T_G| V_B} w_G \quad \text{[Equation 5]}$$

In Equation 5, WB may represent a weight in the B image, $T_B$ may represent the amplitude of the texture in the B image, and VB may represent the standard deviation of noise in the B image. In addition, $C_B$ may represent a parameter value that becomes '1' when the B image and the G image have a positive (+) correlation and becomes '-1' when the B image and the G image have a negative (−) correlation. In Equation 5, when the signal-to-noise ratio (SNR) of the texture is small, that is, when $T_B$ is small and VB is large, the weight may be reduced.

As in Equation 3, Equation 4, and Equation 5, when the texture has a negative (−) correlation, the sign of the weight may be a negative (−) value. The fact that the sign of the weight is a negative (−) value may mean that the weight can be calculated by performing the subtraction operation. That is, as described above with reference to FIGS. 7A to 7C, the weight calculator (330, 331) may perform the subtraction operation to calculate the weight when the increase and decrease of the pixel value of the R image (or B image) and the increase and decrease of the pixel value of the G image are opposite to each other.

According to another embodiment, Equation 6, Equation 7, and Equation 8 may represent examples of setting weights in some cases where the texture amplitude is calculated using the absolute value of a difference between the bright and dark parts within the texture region and the texture amplitude has a sign.

$$w_R = \frac{|T_R| V_G}{|T_G| V_R} w_G \quad \text{[Equation 6]}$$

In Equation 6, $W_R$ may represent a weight in the R image, $T_R$ may represent the amplitude of the texture in the R image, and $V_R$ may represent the standard deviation of noise in the R image. In Equation 6, when the signal-to-noise ratio (SNR) of the texture is small, that is, when $T_R$ is small and $V_R$ is large, the weight may be reduced. In other words, based on the G image, the absolute value of the weight increases as the absolute value of the texture amplitude ($T_R$) of the R image increases, and the weight tends to decrease as the noise standard deviation ($V_R$) of the R image increases.

$$w_G = 1 \quad \text{[Equation 7]}$$

In Equation 7, $W_G$ may represent the weight in the G image, and the weight in the G image may be set to a value of 1 that is used as a reference value.

$$w_B = \frac{|T_B| V_G}{|T_G| V_B} w_G \quad \text{[Equation 8]}$$

In Equation 8, $W_B$ may represent a weight in the B image, $T_B$ may represent the amplitude of the texture in the B image, and $V_B$ may represent the standard deviation of noise in the B image. In Equation 8, when the signal-to-noise ratio (SNR) of the texture is small, that is, when $T_B$ is small and $V_B$ is large, the weight may be reduced.

Hereinafter, the operation of the synthesizer 332 that synthesizes the weights ($W_R$, $W_G$, $W_B$) calculated by the above equations with the first to fourth images (R_IMG, G1_IMG, G2_IMG, B_IMG) to generate the autofocus luminance image (AF_IMG) will be described with reference to the attached drawings.

The synthesizer 332 may apply the weights not only to the average image of the first image (R_IMG), the second image (G1_IMG), and the third image (G2_IMG), but also to the fourth image (B_IMG) as shown in Equation 9 below.

$$O'(x, y) = w_R R(x, y) + w_G G(x, y) + w_B B(x, y) \quad \text{[Equation 9]}$$

In Equation 9, O' may represent the autofocus luminance image (AF_IMG) (i.e., the output signal of the synthesizer 332) output from the synthesizer 332. The output signal (O') may be calculated by summing all of the first value obtained by multiplying the coordinates 'R(x, y)' of the R image by the weight ($W_R$) and the third value obtained by multiplying the coordinates 'B(x, y)' of the B image by the weight ($W_B$).

When the weight is a negative (–) value, the output signal (O') may also become a negative (–) value. In some implementations, when post-processing requires a positive (+) number, a positive (+) constant (Z) can be added to the entire equation so that the output signal (O') does not become a negative (–) value.

$$O'(x, y) = O'(x, y) + Z = w_R R(x, y) + w_G G(x, y) + w_B B(x, y) + Z \quad \text{[Equation 10]}$$

In Equation 10, a constant (Z) may be added to the output signal (O') to obtain a positive (+) output signal (O). If the constant (Z) is greater than a value obtained by inverting the sign of the minimum value of the output signal (O'), the constant (Z) may become a positive (+) value.

If the constant (Z) is determined in advance, the weight may be set as in Equation 11 and Equation 12 below.

$$w'_R = \frac{w_R/2}{|w_R| + |w_G| + |w_B|},\ w'_G = \frac{w_G/2}{|w_R| + |w_G| + |w_B|},\ w'_B = \frac{w_B/2}{|w_R| + |w_G| + |w_B|} \quad \text{[Equation 11]}$$

$$O''(x, y) = w'_R R + w'_G G + w'_B B \quad \text{[Equation 12]}$$

The synthesizer 332 may synthesize the weight $$(w'_R),$$

the weight $$(w'_G),$$

and the weight $$(w'_B)$$

calculated by Equation 11 with the R image, the G image, and the B image, respectively, and may calculate and output the output signal (O") based on the result of synthesis.

Figure 10A:
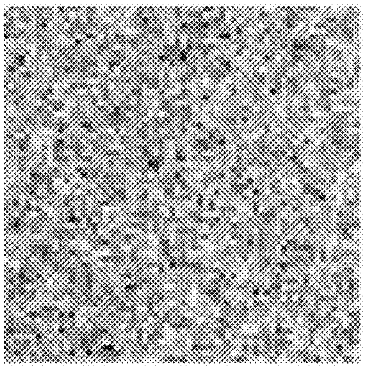
FIGS. 10A to 10C are diagrams illustrating a method for determining an example case in which an absolute value of each weight is adjusted to be small by the weight calculators of FIG. 4 based on some implementations of the disclosed technology.
Figure 10B:
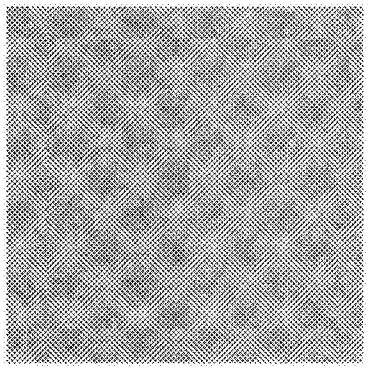
Figure 10C:
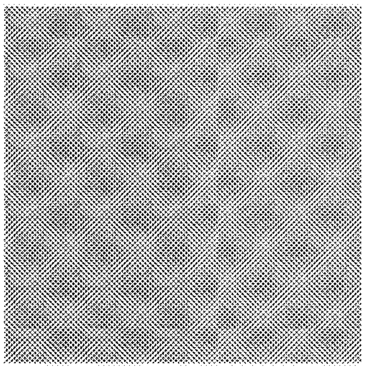

FIGS. 10A to 10C are diagrams illustrating a method for determining an example case in which the absolute value of each weight is adjusted to be small by the weight calculators of FIG. 4 based on some implementations of the disclosed technology.

As shown in FIG. 10A, when the standard deviation of the noise is 40 and the luminance difference in the edge region is 10, the edge crossing two different colors may be blurred to reduce the color edge contrast of the image. In another example, as shown in FIG. 10B, when the standard deviation of the noise is 10 and the luminance difference in the edge region is 10, that is, if the standard deviation of the noise and the luminance difference are the same, the edge between two textures may not be clearly visible and may appear ambiguous. In another example, as shown in FIG. 10C, when the standard deviation of the noise is 1, even if the luminance difference in the edge region is 10, the edge may be preserved and clearly visible.

Accordingly, the weight calculators (330, 331) according to the present embodiment may determine a color with a small signal-to-noise ratio (SNR) and may adjust the absolute value of the weight to be small.

$$SN_R = |T_R| / sqrt(V_R) \quad \text{[Equation 13]}$$

For example, it is assumed that the signal-to-noise ratio (SNR) is small, such as 1 to 2. In Equation 13, the signal-to-noise ratio (SNR) can be calculated by dividing the amplitude ($T_R$) of the texture by the standard deviation ($V_R$) of the noise. For example, the weight calculators (330, 331) may set the weight to zero '0', which is less than '1', when the signal-to-noise ratio (SNR) is less than a preset value of '1'. That is, the weight calculators (330, 331) may detect the signal-to-noise ratio (SNR) of the texture and may adjust the weight in the R image to be smaller than the preset value when the signal-to-noise ratio (SNR) is smaller than the preset value.

Figure 11:
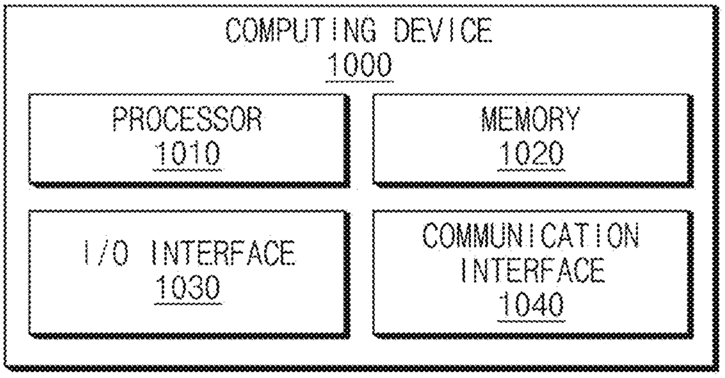
FIG. 11 is a block diagram illustrating an example of a computing device corresponding to the image processing device of FIG. 1 based on some implementations of the disclosed technology.

FIG. 11 is a block diagram showing an example of a computing device 1000 corresponding to the image processing device 200 of FIG. 1.

Referring to FIG. 11, the computing device 1000 may represent an embodiment of a hardware configuration for performing the operation of the image processing device 200 of FIG. 1.

The computing device 1000 may be mounted on a chip that is independent from the chip on which the image sensing device is mounted. According to one embodiment, the chip on which the image sensing device is mounted and the chip on which the computing device 1000 is mounted may be implemented in one package, for example, a multi-chip package (MCP), but the scope of the disclosed technology is not limited thereto.

The computing device 1000 may include a processor 1010, a memory 1020, an input/output (I/O) interface 1030, and a communication interface 1040.

The processor 1010 may process data and/or instructions required to perform the operations of the components (310, 320) of the image processing device 200 described in FIG. 1. That is, the processor 1010 may refer to the image processing device 200, but the scope of the disclosed technology is not limited thereto.

The memory 1020 may store data and/or instructions required to perform operations of the components (310, 320) of the image processing device 200, and may be accessed by the processor 1010. For example, the memory 1020 may be volatile memory (e.g., Dynamic Random Access Memory (DRAM), Static Random Access Memory (SRAM), etc.) or non-volatile memory (e.g., Programmable Read Only Memory (PROM), Erasable PROM (EPROM), etc.), EEPROM (Electrically Erasable PROM), flash memory, etc.).

That is, the computer program for performing the operations of the image processing device 200 disclosed in this document is recorded in the memory 1020 and executed and processed by the processor 1010, thereby implementing the operations of the image processing device 200.

The input/output (I/O) interface 1030 is an interface that connects an external input device (e.g., keyboard, mouse, touch panel, etc.) and/or an external output device (e.g., display) to the processor 1010 to allow data to be transmitted and received.

The communication interface 1040 is a component that can transmit and receive various data with an external device (e.g., an application processor, external memory, etc.), and may be a device that supports wired or wireless communication.

As is apparent from the above description, the image processing device and the imaging device including the same based on some implementations of the disclosed technology can reduce texture noise and improve the degree of autofocus precision by controlling weights to preserve an edge region when pixel values of respective color pixels are synthesized.

The embodiments of the disclosed technology may provide a variety of effects capable of being directly or indirectly recognized through the above-mentioned patent document.

Although a number of illustrative embodiments have been described, it should be understood that modifications and enhancements to the disclosed embodiments and other embodiments can be devised based on what is described and/or illustrated in this patent document. Therefore, the scope of the disclosed technology should not be limited to the above-described embodiments but should include the equivalents thereof.

What is claimed is:

1. An image processing device comprising:

an image combiner configured to generate a plurality of color images by combining pixel data of unit pixels arranged at a same position in each of a plurality of pixel groups of a pixel array; and a luminance image processor configured to calculate weights based on texture amplitudes of the plurality of color images and texture correlation values between the plurality of color images, and to generate a luminance image by applying the weights to the plurality of color images.

2. The image processing device according to claim 1, wherein the luminance image processor includes:

a calculator configured to generate an average image by averaging pixel values of some color images from among the plurality of color images.

3. The image processing device according to claim 2, wherein the luminance image processor includes:

a plurality of texture correlation determiners configured to determine the texture correlation values between each of the plurality of color images and the average image.

4. The image processing device according to claim 3, wherein the plurality of texture correlation determiners is further configured to:

calculate a deviation of each pixel with respect to two color images having different colors from among the plurality of color images;

determine a sign of the deviation; and calculate the texture correlation values based on the sign of the deviation.

5. The image processing device according to claim 3, wherein the plurality of texture correlation determiners is configured to:

calculate the texture correlation values by determining whether pixel values increase or decrease in edge regions of two color images having different colors from among the plurality of color images.

6. The image processing device according to claim 1, wherein the luminance image processor includes:

a plurality of texture amplitude calculators configured to calculate the texture amplitudes based on an absolute value of a contrast difference between two regions that have different luminance levels and are in contact with each other in textures of each of the plurality of color images.

7. The image processing device according to claim 1, wherein the luminance image processor includes:

a plurality of noise amount calculators configured to calculate amounts of noise of the plurality of color images.

8. The image processing device according to claim 7, wherein the luminance image processor includes:

a plurality of weight calculators configured to calculate the weights based on the texture amplitudes, the amounts of the noise, and the texture correlation values.

9. The image processing device according to claim 8, wherein the plurality of weight calculators is configured to:

calculate the weights by performing an addition when the texture correlation values have a positive (+) correlation; and calculate the weights by performing a subtraction when the texture correlation values have a negative (−) correlation.

10. The image processing device according to claim 8, wherein the plurality of weight calculators is configured to:

determine an absolute value of each of the weights to be smaller than a preset value when there is no increase or decrease in the texture correlation values.

11. The image processing device according to claim 8, wherein the plurality of weight calculators is configured to:

determine an absolute value of each of the weights to be smaller than a preset value when a signal-to-noise ratio (SNR) is smaller than a preset value based on the amounts of the noise.

12. An imaging device comprising:

a first texture amplitude calculator configured to calculate a texture amplitude of a first color image;

a first noise amount calculator configured to calculate a noise amount of the first color image;

a calculator configured to generate an average image by averaging a second color image and a third color image having a same color as the second color image;

a first texture correlation determiner configured to determine a texture correlation value between the first color image and the average image;

a second texture amplitude calculator configured to calculate a texture amplitude of the average image;

a second noise amount calculator configured to calculate a noise amount of the average image;

a first weight calculator configured to calculate a weight based on output signals of the first texture amplitude calculator and the second texture amplitude calculator, output signals of the first noise amount calculator and the second noise amount calculator, and an output signal of the first texture correlation determiner; and a synthesizer configured to generate a luminance image to be used for autofocus adjustments by applying the weight to the first color image and the average image.

13. The imaging device according to claim 12, wherein each of the first texture amplitude calculator and the second texture amplitude calculator is configured to:

calculate the texture amplitude based on an absolute value of a contrast difference between two regions that have different luminance levels and are in contact with each other in each of textures of the first color image and the second color image.

14. The imaging device according to claim 12, wherein the first texture correlation determiner is configured to:

calculate the texture correlation value by calculating a deviation of each pixel with respect to the first color image and the average image and determining a sign of the deviation.

15. The imaging device according to claim 12, wherein the first texture correlation determiner is configured to:

calculate the texture correlation value by determining whether pixel values increase or decrease in edge regions of the first color image and the average image.

16. The imaging device according to claim 15, wherein the first weight calculator is configured to:

calculate the weight by performing addition when the texture correlation value has a positive (+) correlation; and calculate the weight by performing subtraction when the texture correlation value has a negative (−) correlation.

17. The imaging device according to claim 12, wherein:

the first color image has a red color, and each of the second and third color images has a green color.

18. The imaging device according to claim 17, wherein the first weight calculator is configured to:

calculate the weight so that subtraction is performed in a case that a change in luminance of the first color image is opposite to a change in luminance of the average image.

19. The imaging device according to claim 12, further comprising:

an image sensor configured to generate image data including a plurality of pixel groups; and an image combiner configured to generate the first color image and the second color image by combining pixel data of unit pixels arranged at a same position in each of the plurality of pixel groups.

20. The imaging device according to claim 19, wherein each of the plurality of pixel groups includes:

a plurality of unit pixels arranged in an (N×N) matrix shape, where 'N' is an integer greater than or equal to 2, wherein the plurality of unit pixels has color filters of a same color and shares a single microlens.

* * * * *